United States Patent [19]

Kuno et al.

[11] 4,076,001
[45] Feb. 28, 1978

[54] PRECHAMBER MOUNTING FOR INTERNAL COMBUSTION ENGINE

[75] Inventors: Tadashi Kuno, Kamifukuoka; Akihiko Abe, Kurume; Akito Shoji, Saitama, all of Japan

[73] Assignee: Honda Giken Kogyo Kabushiki Kaisha, Tokyo, Japan

[21] Appl. No.: 696,827

[22] Filed: Jun. 16, 1976

[30] Foreign Application Priority Data

Jun. 30, 1975  Japan .................................. 50-92063

[51] Int. Cl.² .......................... F02B 23/00; F16J 15/00
[52] U.S. Cl. .............................. 123/191 S; 123/32 SP; 123/75 B; 277/106; 277/170
[58] Field of Search ............. 123/32 C, 32 SP, 32 ST, 123/75 B, 188 P, 188 GC, 188 R, 188 AF, 191 S, 191 SP; 137/454.6; 277/106, 114, 169, 170, 171, 172

[56] References Cited

U.S. PATENT DOCUMENTS

| | | | |
|---|---|---|---|
| 2,991,092 | 7/1961 | MacKay | 277/170 |
| 3,192,942 | 7/1965 | Manor et al. | 277/106 |
| 3,244,797 | 4/1966 | Watson | 277/169 |
| 3,406,667 | 10/1968 | Evans et al. | 123/32 SP |
| 3,425,399 | 2/1969 | Ward et al. | 123/32 ST |
| 3,892,216 | 7/1975 | Davis | 123/32 SP |
| 3,919,984 | 11/1975 | Yagi et al. | 123/32 SP |
| 3,987,765 | 10/1976 | Sato et al. | 123/32 SP |

*Primary Examiner*—Charles J. Myhre
*Assistant Examiner*—David D. Reynolds
*Attorney, Agent, or Firm*—Lyon & Lyon

[57] ABSTRACT

The cylinder head of an internal combustion engine has a bore provided with an annular shoulder. A liner "U" shaped in cross section has an outward extending radial end flange which overlies the shoulder. A valve guide is insertable into the bore and has a second shoulder overlying the end flange. The end flange is clamped between seal rings by means of a nut acting through a Belleville spring encircling the valve guide. The liner defines an auxiliary combustion chamber therein and the liner has an opening in a wall thereof which forms a flame passage leading to a main combustion chamber.

4 Claims, 5 Drawing Figures

PRECHAMBER MOUNTING FOR INTERNAL COMBUSTION ENGINE

This invention relates to internal combustion piston engines in which an auxiliary combustion chamber is positioned adjacent each main combustion chamber and connected thereto by means of a flame passage. It is highly desirable to provide a hollow thin-wall liner or cup to form the auxiliary combustion chamber, and the liner is formed of heat resistant material such as, for example, stainless steel. An opening in the wall of the liner forms at least a part of the flame passage and another opening in the wall of the liner communicates with an igniter such as a spark plug. The liner must be held in proper position and orientation. It must be removable for replacement, if necessary, after a long period of use. Peak pressures are generated in the auxiliary combustion chamber when the spark plug fires the combustible mixture therein, and it is important that the pressures generated in the gases undergoing combustion be prevented from permitting escape of gases through the bore through which the liner is inserted into position.

In previous constructions, the "third valve" for admitting an air-fuel mixture into the prechamber has included a valve guide mounted in the liner installation bore, and having a poppet valve slidably mounted therein and closing against a seat formed on the lower end of the valve guide. The valve guide is held in place by a nut and the valve guide holds the liner in position. However, some difficulty has been encountered in preventing escape of combustion gases to atmosphere through clearance spaces between the valve guide and the liner installation bore.

In accordance with this invention, seal rings or gaskets are placed above and below an outward extending radial end flange on the liner and the parts are clamped together against a shoulder by means of the clamping nut. A Belleville spring receives the force of the clamping nut so that the clamping action on the seal rings is resilient and avoids development of any axial looseness following a period of use. A seal ring is also provided between the valve guide and the bore. Leakage of combustion gases is effectively prevented.

Other and more detailed objects and advantages will appear hereinafter.

Figure 1:
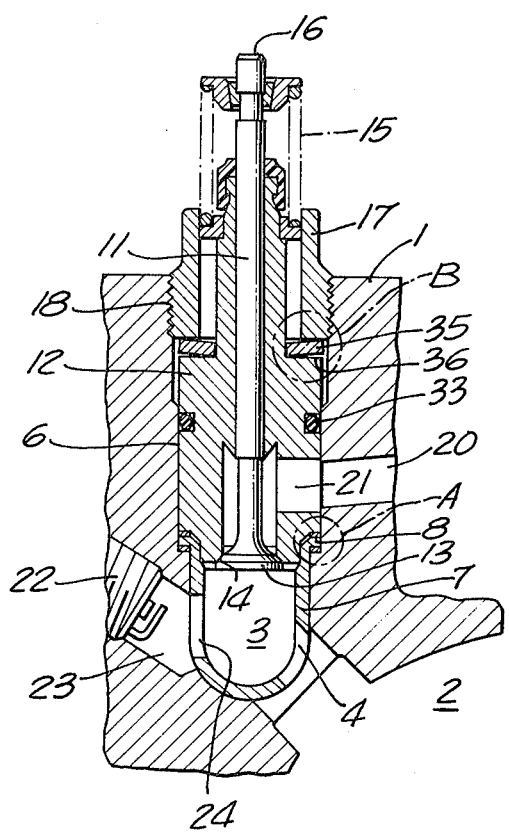
FIG. 1 is a sectional elevation showing a preferred embodiment of this invention.

Referring to the drawings, the stationary member 1 comprises the cylinder head of an internal combustion engine having a main combustion chamber 2 and an auxiliary combustion chamber 3. A cylindrical bore 6 in the cylinder head 1 is provided through which a hollow liner 7 "U" shaped in cross section may be axially inserted into position. The interior portion of the liner 7 defines the auxiliary combustion chamber 3 and the opening 4 in the wall thereof defines the flame passage connecting the auxiliary chamber 3 to the main chamber 2. The liner 7 is provided with an outward extending radial end flange 8 which overlies a shoulder 9 formed in the bore 6. The valve guide 12 mounted in the bore 6 has a shoulder 5 which overlies the end flange 8.

A poppet valve 11 slidably mounted in the valve guide 12 has a head 13 which closes against a seat 14 formed at the end of the valve guide 12. A coil compression spring 15 acts to hold the valve 11 in closed position. Conventional means acting on the upper exposed end 16 of the valve stem serve to open the valve cyclically against the action of the spring 15, during operation of the engine. A nut 17 is connected by threads 18 to the cylinder head 1 and serves to hold the assembly in place.

An air-fuel mixture supplied to the intake passage 20 passes through the port 21, and when the valve is open passes into the auxiliary combustion chamber 3. After the compression stroke the spark plug 22 ignites the mixture in the space 23 which communicates with the interior of the liner 7 through the opening 24. Combustion takes place in the auxiliary chamber 3 and the resulting flame projects through the flame passage 4 to burn the mixture in the main chamber 2.

Figure 2:
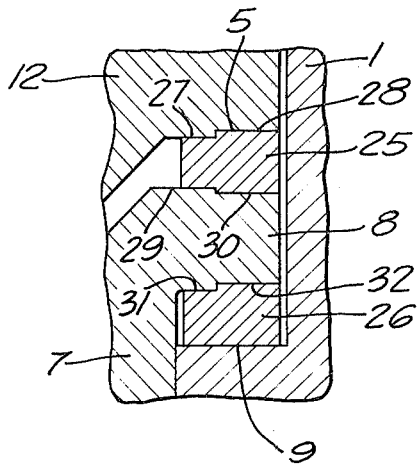
FIG. 2 is an enlarged sectional detail of the zone shown at A in FIG. 1.

In accordance with this invention, means are provided for preventing escape of gases under pressure from the auxiliary chamber 3. This means includes the provision of seal rings or gaskets 25 and 26 positioned above and below the end flange 8, as best shown in FIG. 2. These seal rings or gaskets 25 and 26 have stepped surfaces 28, 30 and 32 shaped to interfit and cooperate with the stepped surface 27 forming the shoulder 5 on the valve guide 12, the stepped surface 29 on the upper surface of the end flange 8, and the stepped surface 31 on the lower surface of the end flange 8, respectively.

An O-ring 33 is mounted in a groove on the valve guide 12 for contact with the bore 6 at a location above the position of the intake passage 20 and the port 21.

Figure 4:
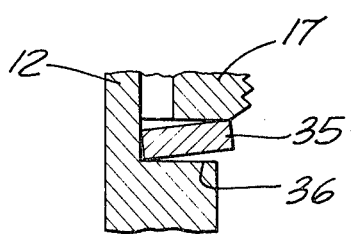
FIG. 4 is an enlarged sectional detail of the zone shown at B in FIG. 1.

A Belleville spring 35 is mounted in the bore 6 and encircles a portion of the valve guide 12. This Belleville spring 35 is contacted by the lower end of the clamping nut 17 and rests on a shoulder 36 on the valve guide 12, as best shown in FIG. 4. The clamping force of the nut acts through the Belleville spring 35 to apply the correct degree of pressure to the seal rings 25 and 26. Any axial looseness which might otherwise develop after a period of use between the valve guide 12, the cylinder head 1, the end flange 8, and the seal rings 25 and 26 is thus prevented by the resilient spring action of the Belleville spring 35.

The stepped seal ring 25 and 26 effectively prevent escape of combustion gases into the bore 6, and these parts are maintained in sealing relationship during long periods of use by the resilient action of the Belleville spring 35. Furthermore, the Belleville spring 35 acts to prevent loosening action of the clamping nut 17.

Figure 3:
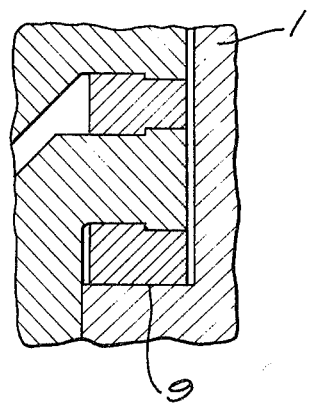
FIG. 3 is a sectional view similar to FIG. 2, showing a modification.

The modification shown in FIG. 3 employs similar stepped surfaces on confronting shoulders, but the thickness of the flange 8 is greater near its outer diameter than radially inward therefrom.

Figure 5:
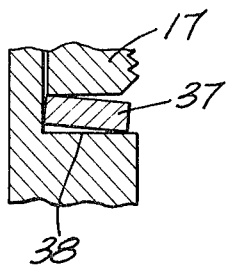
FIG. 5 is a view similar to FIG. 4 showing a modification.

In the modification shown in FIG. 5, the Belleville spring 37 has a radially outer portion resting on the shoulder 38 while its radially inner portion is contacted by the clamping nut 17.

The modifications of FIGS. 3 and 5 operate in substantially the same fashion as that previously described.

Having fully described our invention, it is to be understood that we are not to be limited to the details herein set forth but that our invention is of the full scope of the appended claims.

We claim:

1. In an internal combustion engine having a stationary member, a portion of said member forming one wall of a main combustion chamber, said member having a bore provided with a first annular shoulder, a liner insertable into said bore, said liner having an outward extending radial end flange overlying said shoulder, said liner defining an auxiliary combustion chamber therein and having an opening in one wall thereof, said opening forming a flame passage connecting said chambers, a valve guide insertable into said bore and having a second shoulder overlying said end flange, a poppet valve slidably guided on said valve guide and adapted to close against a seat formed at one end thereof, a first seal ring positioned between said first shoulder and said end flange, and a second seal ring positioned between said end flange and said second shoulder, the improvement comprising, in combination: said end flange having a radially extending stepped surface on the upper surface thereof, said second shoulder having a radially extending stepped surface, said second seal ring having radially extending stepped surfaces shaped to interfit and cooperate with said stepped surfaces of said end flange and said second shoulder, a Belleville spring encircling a portion of said valve guide, and a nut in threaded engagement with said member acting on said Belleville spring to place both of said seal rings under compression.

2. The combination set forth in claim 1 in which the end flange is stepped so that the radially outer portion has a different axial thickness than the radially inner portion.

3. The combination set forth in claim 1 in which a third seal ring is positioned between said valve guide and said bore.

4. The combination set forth in claim 1 in which the end flange has a stepped surface on the lower surface thereof, and the first seal ring has a stepped surface shaped to interfit and cooperate with said stepped surface on the lower surface of said end flange.

* * * * *